(12) United States Patent
Gadini

(10) Patent No.: US 6,240,728 B1
(45) Date of Patent: Jun. 5, 2001

(54) ELECTROMECHANICAL DEVICE AND INSULATION METHOD THEREOF

(75) Inventor: Costanzo Gadini, Casale Monferrato (IT)

(73) Assignee: Eltek S.p.A., Monferrato (IT)

( * ) Notice: Subject to any disclaimer, the term of this patent is extended or adjusted under 35 U.S.C. 154(b) by 0 days.

(21) Appl. No.: 09/341,439

(22) PCT Filed: Jan. 14, 1998

(86) PCT No.: PCT/EP98/00179

§ 371 Date: Jul. 9, 1999

§ 102(e) Date: Jul. 9, 1999

(87) PCT Pub. No.: WO98/32141

PCT Pub. Date: Jul. 23, 1998

(30) Foreign Application Priority Data

Jan. 15, 1997 (IT) ................................. TO97A0026

(51) Int. Cl.[7] ....................................... F01B 29/10
(52) U.S. Cl. .................................. 60/529; 60/528
(58) Field of Search ........................ 60/528, 529

(56) References Cited

U.S. PATENT DOCUMENTS

| | | | |
|---|---|---|---|
| 5,020,325 | * | 6/1991 | Henault .................................. 60/528 |
| 5,263,324 | * | 11/1993 | Herndon ............................. 60/528 X |
| 5,622,482 | * | 4/1997 | Lee ..................................... 60/528 X |
| 5,666,810 | * | 9/1997 | Miesterfeld et al. .............. 60/528 X |
| 5,866,882 | * | 2/1999 | Saur et al. ......................... 60/528 X |

FOREIGN PATENT DOCUMENTS

| | | | |
|---|---|---|---|
| 542149 | * | 11/1955 | (BE) . |
| 1276780 | * | 11/1968 | (DE) . |
| 0098308 | * | 1/1984 | (EP) . |
| 2217784 | * | 9/1974 | (FR) . |

* cited by examiner

Primary Examiner—Hoang Nguyen
(74) Attorney, Agent, or Firm—Levine & Mandelbaum

(57) ABSTRACT

An actuator device has electrical components, which are subjected to electric voltage, located inside a housing near movable mechanical elements. Insulation of the electrical components from the environment is achieved by introducing into the housing an expanding material, specifically a silicone elastomer of a type suitable to reticulate for forming a protective foam.

32 Claims, 2 Drawing Sheets

ELECTROMECHANICAL DEVICE AND INSULATION METHOD THEREOF

This application is a 371 of International Application No. PCT/EP98/00179 filed Jan. 14, 1998.

DESCRIPTION

The present invention refers to an electromechanical device, such as for instance an actuator device, as defined in the preamble of claim 1, and to a method to insulate components of an electromechanical device from the environment, as defined in the preamble of claim 22; the features of the preamble of said claims are known for instance from BE-A-542.149, which describes a manual safety switch.

Electromechanical devices are known, which comprise a housing within which electrical components and movable mechanical elements or kinematic motions are contained, often near to each other. Let us think for instance of electrothermal actuator devices applied in various fields, including domestic appliances and environment air conditioning. Said electrothermal devices usually comprise an external housing, for example in thermoplastic material, wherein a thermoactuator and at least partially a movable operating shaft are contained.

The thermoactuator comprises a body made of electrically and thermally conductive material (for instance steel), containing a thermally expansible material (such as for instance wax), wherein a sliding thruster element is embedded. Said body is in contact with an electric heater, typically consisting of a resistor with a positive temperature coefficient (PTC), which is electrically supplied by two terminals.

When electric voltage is supplied to the supply terminals, the heater generates heat and causes the expansion of the thermally expansible material. Such an expansion causes the thruster to make a linear displacement outside the thermoactuator body; the thrust generated by the thruster is therefore transferred to the above shaft that will move linearly till it reaches a stable work position generally determined by a mechanical limit stop, provided inside the housing of device. When the power supply stops, the heater cools down and the thermoexpansible material will shrink causing both the thruster and the shaft to go back to their initial rest positions, respectively, with the aid of an elastic return element, such as a spring.

The present invention basically acknowledges that, in some applications, the electric components of certain electromechanical devices may be subject to malfunction risks, due to the aggressive influence of external agents in the environment.

This may for instance happen when the above thermoelectric actuators are used in air conditioning or air cleaning systems, where the air to be conveyed or cleaned contains aggressive agents or contaminant substances, which may favour a development of electric discharges or electric energy leakages, overabsorptions or short-circuits with ensuing faults of the device itself.

Another critical application field is represented by household appliances, where said thermoelectric actuators may be located near water and/or detergent agent dispensers, whose likely losses might cause the above contamination with damaging effects for the device.

Therefore, under these circumstances, the use of electrically controlled actuator devices is rather problematic, above all when such devices need to be small sized, so that electrical parts are necessarily placed near movable mechanical components. Apparently, to obviate to this problem it would be enough to provide an airtight sealing for the housing of the device that contains the live electric components.

However, the housings of the actuator devices of the type commonly used are not fit as such to warrant such a sealing from the environment, due to the presence of openings needed for the outcoming of movable mechanical components or of fissures due to an imperfect coupling of the external shells of the housing (to this purpose it should be noted that such components are commonly subject to shrinkage and/or stresses during the molding cycle of thermoplastic material).

Manufacture of special airtight housings, for instance through insertion of perimetral gaskets, would increase the overall dimensions of the device and make the productive process of the device rather complex, with a consequent increase of manufacturing time and costs.

A possible option would be to inject a suitable material inside the housing of the electromechanical device, capable of insulating the internal live components from the environment; however, also this solution appears somewhat problematic.

A first difficulty, for instance, is due to the need of fully coating the electrical components of the device, but without any interference with the motion of the mechanical elements located nearby. A further difficulty consists in ensuring a fast filling (normally in the order of a few seconds) of the area to be insulated in order to allow for an automated manufacturing process. The filling material should also set very quickly to allow immediate handling of the device and avoid leakage from the joining areas of the relevant housing.

Finally, said filling material should be easily removable in case of accidental leaking from the housing during the injection operation.

It should also be considered, when insulating electrothermal devices, that the filling material must be suitable to withstand high temperatures over a long time, which in the instance of thermoactuators normally reach about 200° C.

In order to better highlight the problems at the base of this invention, reference will be made in the following to a thermal electromechanical device, i.e. a thermoactuator, which reflects a whole number of unfavorable characteristics for the use of classic filling and/or insulating materials, as mentioned hereafter.

It is known to make use of certain resins to insulate electronic circuits from the environment, which are usually poured at room temperature into a housing containing the circuit.

In different applications, other fluid resins are injected at high temperature in a body or mold, where they set fast while cooling down; other resins are mixed at room temperature with a catalyst element suitable to determine a fast setting of the resin; further types of resins are also injected at room temperature and hardened by external heat or ultraviolet rays.

Said resins may initially appear as a fluid or viscous material, which becomes a very hard glassy material following reticulation or transformation process.

As already mentioned, resins with a low working temperature cannot be employed for a thermoactuator, as they would be degraded by the high temperature of the heating elements. Also the resins becoming very rigid after their process are not suitable for such an application, since they do not allow any mechanical expansion. Let us think for instance of the electric heater used in a thermoactuator, which tends to expand during operation under temperature; if rigid resins were used, the heater would be mechanically stressed by its own expansion with the risk of failure (for this reason, PTCs, usually made of ceramic material, would be subject to failure). At any rate, resins generally have a highly compact volume tending to stick or block all components they come in contact with; even in case of very small metering errors of the injected material, there would be some jamming up risks for the movable actuation elements or kinematic motions inside the housing of the device. Such a jamming risk is stressed by the fact that said filling should be executed very fast by automatic systems, through which small, but exact, volumes of material can be injected.

The likely use of very fluid filling materials would ensure fast filling, but cause a risk of leakage from the housing joints; on the other hand, the use of less fluid materials would increase manufacturing cycle time, requiring longer dwelling times for a correct setting of the insulating material inside the housing.

To obtain insulation from the environment some silicone resins are also known, which if injected in the housing of an actuator device, would neither cause any stressing under normal temperature thanks to their flexibility nor would be subject to degradation with high temperatures.

However, also silicones would tend for their own nature to leak out of the housing and require a subsequent removal of residues from the housing surface, which is a rather complex operation.

To avoid a similar problem the use of fast setting silicones would be theoretically possible; however, in this case, the injected silicone would not have enough time to fully enter the housing section (usually of complex geometry) containing the live electric components, i.e. subject to electric voltage; therefore the insulation of such components from the environment would not be warranted.

On the other hand, if a fast silicone should be injected inside the housing of an actuator device, there would be the risk of causing infiltration between the mechanical components and their consequent jamming.

Finally, it should also be noted that the volume of the filling material—as a function of its thermal characteristics—may act as a temperature dissipator or thermal flywheel, thus badly affecting the operating precision of the device; for example, in the case of a resin having a high thermal dissipation capacity, the heating times of a thermoactuator would be extended with a globally slower reaction of the device.

Insulating materials of the expanding type are also known, which are used for instance for the purposes of refrigerators insulation or sealing of tubes for electric wires within buildings or for protecting from vibration electronic control units on motor-vehicles; said expanding materials are used, anyway, for the insulation of devices that are not equipped with movable mechanical elements.

Therefore, summarizing, the materials normally used to insulate from the environment components being subject to electric voltage do not appear to be suitable for use in electromechanical devices of the above type, i.e. comprising a housing wherein both the electrical components and movable mechanical elements are contained, for the following reasons:

the presence of openings or fissures in the housing of the actuator device does not advise the injection of an insulating material according to the types described above, since some of such material may come out with the consequent need of a laborious and expensive removal of residues;

manufacture of the actuator device should occur in the shortest time possible and anyway the insulation stage of the electric components from the environment should have a duration compatible with the other production cycle steps (a few seconds);

the insulating material injected should flow consistently inside the housing of the device to ensure a safe coating of the electric components to be insulated from the environment;

since the electric components to be insulated inside the housing of the device are located near movable mechanical components, injection of an insulating material according to the types described above is risky due to possible mechanical jamming problems of the device caused by the setting of such a material, also in case of small errors during the injection stage;

as to the devices operating on the basis of heating and cooling cycles, the insulating material being used should not act as a thermal dissipator or flywheel, for avoiding to affect the reaction times and consequently the operating precision of the device itself;

the insulating material used should not be subject to degradation in case the actuator device will develop high working temperatures (as in the instance of thermoactuators);

finally, the insulating material used should not be a rigid one, in order to avoid internal stresses to the device, caused by either an expansion of the electric components or elongation of the material itself under temperature.

It is the object of this invention, based on the acknowledgment of the above problems, to provide an electromechanical device, specifically an actuator device, warranting insulation of certain components from the environment, but without jeopardizing or affecting the general operation of the device itself and/or causing its industrial manufacture to be complex, time taking or expensive.

Said object is reached according to the present invention by introducing in the housing of the electromechanical device an insulating material suitable to form a spongy or foamy structure, therefore an elastic one, having a lower resistance to mechanical compression and/or to tensile stresses, thus allowing motion of the various elements; moreover, said structure can be easily broken and removed for easy cleaning of the residues eventually run out of the housing.

The specific features of the present invention are reported in the annexed claims, which are integral part of this description.

Further objects, characteristics and advantages of the present invention will become apparent from the following detailed description and annexed drawings, which are only supplied by way of a non limiting example, wherein:

FIGS. 1, 2 and 3 show a thermal actuator device in a substantially known embodiment, of the type capable of impressing a thrust to an interlocked element (not represented), such as a flap of an air ventilation or purification system, a valve for hydraulic ducts, a detergent dispenser for household appliances, etc.

Figure 2:
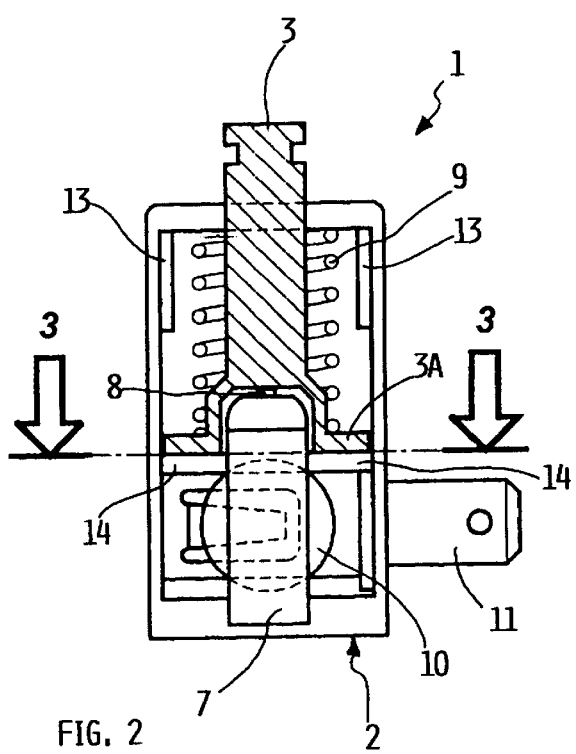
FIG. 2 shows a section of the device of FIG. 1 according to the axis 2—2.

Such an actuator device indicated as a whole with 1, comprises an external housing 2, obtained for instance by the mutual engagement of two half-shelves 2A and 2B in thermoplastic material. The housing 2 has an opening on one of its lengthwise ends (the figure shows the upper end), wherefrom a part of an operating shaft 3 is protruding outside.

On the opposite end of the housing 2 a flanged part 4 is present, with holes 5, which allows the device 1 to be fastened by screws to a fixed part of the apparatus on which the device itself will be used.

Number 6 indicates two side openings of the housing 2, provided for air recirculation, in order to speed up the cooling stage of a thermal element, as described in the following. Number 6A indicates an opening provided for allowing the introduction of an insulating material in the housing 2, according to the present invention.

A thermal actuator indicated with 7, not sectioned in the figure, having a relevant thrusting element or small piston 8 is located inside the body 2; an end of piston 8 is confined inside the body of the thermoactuator 7, whereas the other end comes out of it to operate by thrust on the actuating shaft 3.

The thermoactuator 7 is made integral with the housing 2 in a known manner, within which also the shaft 3 is at least partially housed.

The shaft 3 is movable under the action of the small piston 8, contrasting the action of a spring 9; said spring 9 is located inside the housing 2, between its upper portion and an enlargement 3A of the shaft 3; as it can be seen, an end of the shaft 3 is in contact with the small piston 8, whereas the opposite end protrudes out of said upper opening of the housing 2.

Number 10 indicates a heating element for the thermoactuator 7, such as a thermistor with positive temperature coefficient, or PTC; numbers 11 and 12 indicate the electric supply terminals, respectively. As it can be seen, terminals 11 and 12 have each one a portion that appears to be located inside the housing 2; such inner parts of terminals 11 and 12 are fitted with respective contact foils with the heating element 10 and the body of the thermoactuator 7, which consists of an electrically and thermally conductive material. Thus, electric continuity can be determined between the terminal 12, the thermoactuator 7 and the heating element 10.

Number 13 indicates striker elements defined in the upper inner portion of the housing 2, whose function is to provide mechanical limit stops to the shaft motion 3. Finally, number 14 indicates supports made with the same plastic material used for the housing 2, whose task is to define a positioning seat for the thermoactuator 7.

The device 1 is of known type and operation, as described at the beginning of this description. Therefore, if a supply signal is transmitted to terminals 11 and 12, the heating element 10 will generate heat, which is transferred to the body of the thermoactuator 7, to cause the expansion of a thermoexpandible material (wax) contained inside it.

Such an expansion causes a linear motion of the small piston 8, which goes on till the enlargement 3A of the shaft 3 will reach the striker elements 13; therefore, in other words, the thermoactuator 7 causes a position change between the shaft 3 and the housing 2.

Upon ceasing the supply signal to terminals 11 and 12, the thermal element 10 cools down and both the small piston 8 and shaft 3 go back to their initial rest positions through the action of the spring 9.

In some applications of the device 1, its live elements (i.e. those being subject to electric voltage) could be conveniently insulated from the environment, whenever the latter contains some agents that may develop electric discharges or electric energy leakages, overabsorptions or short-circuits, with a consequent risk of permanent damages to the actuator device.

Such a problem does not generally exist for the part of terminals 11 and 12 located outside the housing 2; such terminals are in fact sufficiently apart from each other and they can be well insulated through a proper protecting sheath.

On the contrary, insulation is a critical problem for the electric parts inside the housing 2, i.e. for the internal part of terminals 11 and 12, heater 10 and body of the thermoactuator 7.

Let us consider for instance that, during operation of the device 1, the body of the thermoactuator 7 is fully live (electrically conductive) and that the heater 10 has a highly reduced thickness (PTC thickness in this kind of applications is typically about 2–3 millimeters); therefore, the undesired deposition of an electrically conductive agent on the PTC, such as a salty mist or air suspended residues, may cause an electric discharge between the terminal 11 and the body of the thermoactuator 7, supplied by the terminal 12, with a consequent short-circuit and failure of the heater itself. The deposition of aggressive agents on live elements may cause electric energy leakages or overabsorptions, which are obviously affecting the operating properties of the device. To this purpose, let us also consider that PTCs usually have a metallization obtained with silver based alloys on its two opposite flat surfaces; the material of said metallization under high environment humidity and the action of electric fields tends to migrate towards the heater edges, thus reducing the electric insulating distance.

According to the present invention, the required insulation is obtained introducing in the housing 2, through the opening 6A, a material suitable to form a spongy structure, having a low resistance to mechanical tensile stresses and compressions, as well as capable of withstanding high temperatures; such a material can favorably consists of an expanding silicone elastomer, i.e. a type suitable to form a foam.

Figure 1:
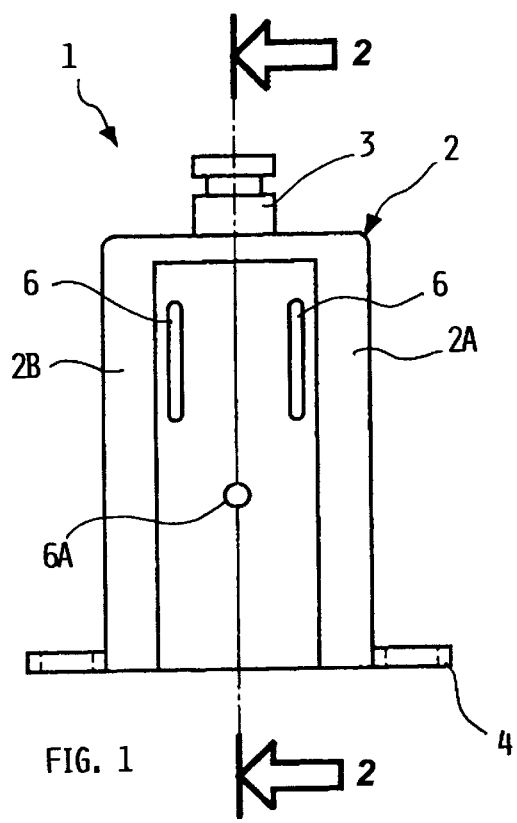
FIG. 1 shows a side view of an actuator device.
Figure 3:
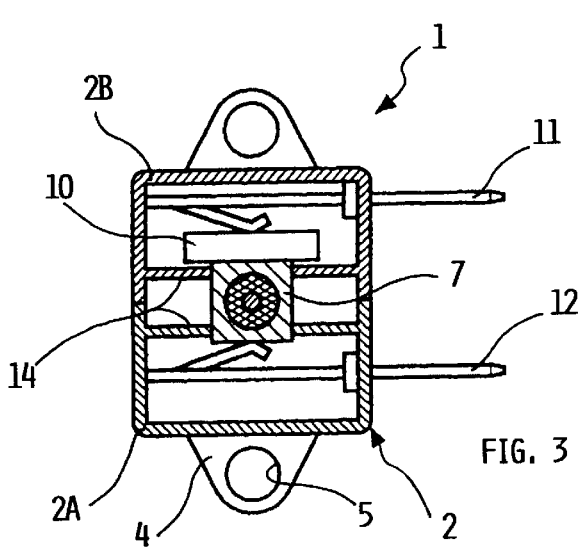
FIG. 3 shows a section of the device of FIG. 2 according to the axis 3—3.
Figure 4:
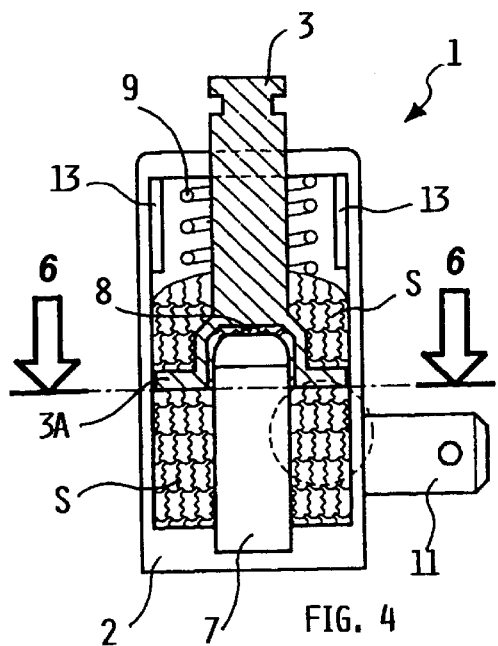
FIG. 4 shows, by a section similar to that of FIG. 2, an actuator device according to the present invention.
Figure 6:
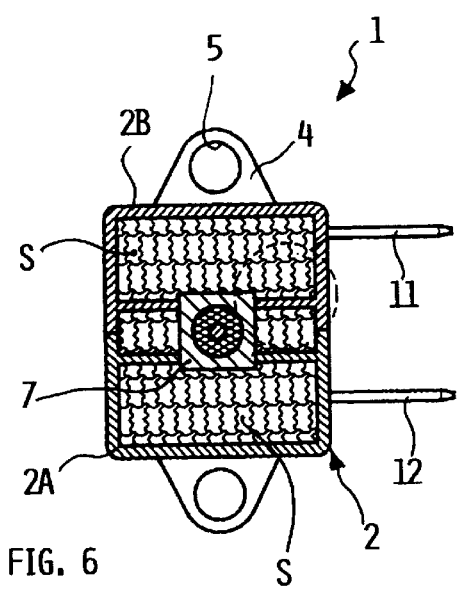
FIG. 6 shows a section of the device of FIG. 4 according to the axis 6—6.

FIGS. 4 and 6 represent in fact, with two sections, an actuator device according to the present invention. It should be noted, anyway, that the device of FIGS. 4 and 6 corresponds in practice to the one of FIGS. 1–3, but with addition of the above insulating material. To this purpose it should be underlined how the insulating operation from the environment according to the present invention can be obtained with all the components of the device 1 already arranged inside the housing 2 (i.e. with the device already assembled and eventually already submitted to a first testing).

Said insulating material may consist for instance of SILBIONE®, manufactured by the Company Rhône-Poulenc, which is a silicone elastomer capable of curing or vulcanizing at room temperature, by a polyaddition in equal ratio of two components (being commercially known with codes RTV 72572 A and RTV 72572 B), and forming a rubber foam; such a foam is highly elastic and has a low mechanical resistance, so that it can be compressed and torn by very low mechanical forces. This notwithstanding, said foam is extremely resistant to high operating temperatures and has excellent electric insulating features.

For further information about this type of silicone elastomer reference can be made to the relevant technical documentation supplied by the manufacturer.

Said silicone elastomer consisting of two components, having in particular a 1:1 mixing ratio, allows the use of a simple static mixer for injection in the housing 2. Said static mixer can for instance consist of a small thermoplastic tube, with internal labyrinths determining cross passages between the two flows of the components of the elastomer; said mixer has an extremely low cost and can be easily replaced on the manufacturing equipments.

Both fluid components of the elastomer are injected in a known way through the opening 6A into the housing 2 of the actuator device 1; when said two components come in contact and mix together, they develop a gas capable of causing expansion and reticulate to form a flexible foam, indicated with S in the figure, having self-lubricating properties.

It should be noted in the specific case that the two components are in fluid form and reticulate after about 40 seconds following their mutual contact or mixing; therefore, during the injection stage there is all the time required to let the fluid mixture enter the parts involved of the housing 2, to safely coat all electric components, specifically the body of the thermoactuator 7, the heater 10 and the internal part of terminals 11 and 12; it should also be noted that the time required to obtain foam S is about one minute.

These times are preset for allowing a manufacturing process through automated lines capable of assembling and insulating the part in a few seconds (e.g. 5 seconds), without causing any clogging of the injection machines for the silicone elastomer and allowing for an immediate handling of the finished part.

FIGS. 4 and 6 show a situation where the foam S is already formed; as it can be noted, after reticulation of the two cited components, the foam S completely fills the lower portion of the device, where the electric components to be insulated are located; from FIG. 4 it can also be noted how the foam S also covers a section of the shaft 3 and the spring 9, i.e. the movable mechanical elements of the device 1.

Figure 5:
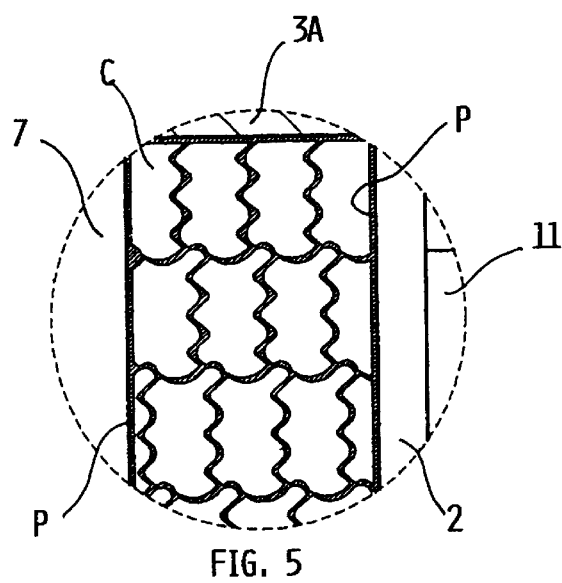
FIG. 5 shows an enlargement of a part of FIG. 4.
Figure 7:
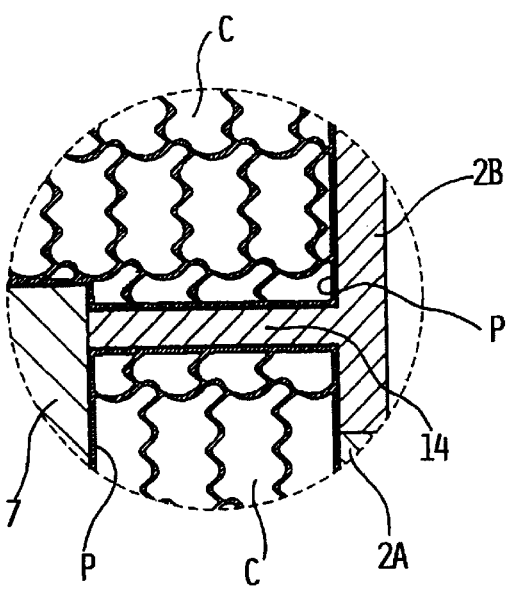
FIG. 7 shows an enlargement of a part of FIG. 6.

As it can be noted from the enlargement of FIGS. 5 and 7, the spongy structure formed by the silicone elastomer is of the netting type, i.e. defining a plurality of cells, some of them being indicated with C. The presence of such a netting structure allows an easy compressibility of the foam, so as any stress within the device 1 is avoided; said netting structure also causes the foam S to be substantially 'neutral' from the temperature standpoint, in other words, the foam does not operate as a thermal dissipator or flywheel.

It is also important to note how in line with the contact points between the foam S and the surrounding surfaces (see for instance the contact points between the foam S and the surfaces of the housing 2, of the thermoactuator 7, of the heater 10) a uniform and continuous film results in being formed, indicated with P, already suitable as such to warrant an airtight coating of the electric components from the environment; said film P quickly and uniformly spreads under the thrust of the gas released inside cells C, even to the most difficult recesses to be reached in the housing 2.

Figure 8:
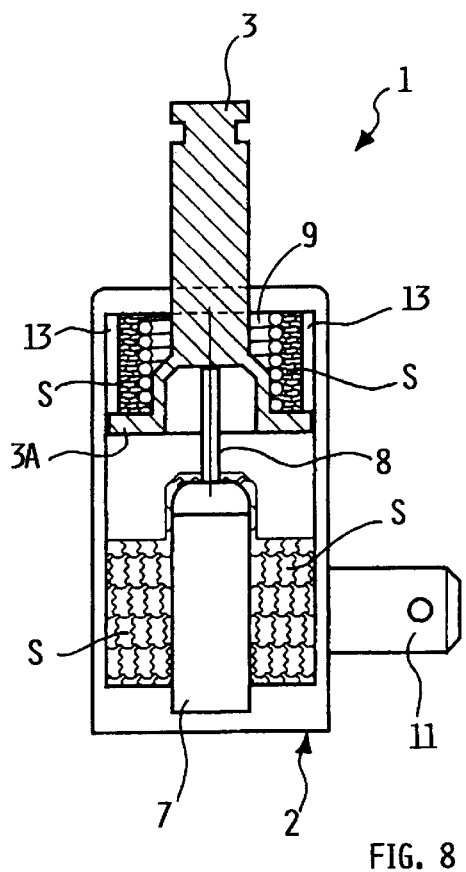
FIG. 8 shows, by a section similar to that FIG. 4, the actuator device of FIGS. 4 and 6, during its first actuation.

In FIG. 8 the device 1 is represented after one actuation, which substantially consists in supplying power to terminals 11 and 12; as previously described, the heater 10 will heat the thermoexpandible material contained in the body of the thermoactuator 7, so that the thruster 8 comes out of it; therefore the thrust is transferred to the shaft 3 contrasting the action of the spring 9, till it reaches its limit stop position, which is maintained if power is supplied to terminals 11 and 12.

As it can be seen in FIG. 8, after actuation performance, the enlarged section 3A of the shaft 3 divides practically the foam S in two portions, namely an upper portion (which was originally formed on the top of section 3A) and a lower portion in the lower section of the housing 2, which will insulate a part of the terminals 11 and 12, the heater 10 and the thermoactuator 7. Therefore, following the first actuation of the device, the portion of excess foam is easily 'torn away' from the portion provided for the real and proper insulation, and then simply compressed by the thrust imparted to the shaft 3.

Therefore, said features will prevent a clogging risk of the device, since the excess or useless portion of foam S depositing on the movable elements can be torn and/or compressed by the same elements without affecting the operation of the device.

It follows that there is no need for a high metering precision, as likely excess errors do not determine any clogging risks.

As mentioned previously, the housing 2 may have some side openings (6) or more simply some possible runways for the elastomer components (for instance fissures in the joining points of the half-shells 2A and 2B forming the housing 2).

Also in the case of the present invention, it may happen that part of the injected components may partially come out, causing some foam residues S on the outside surface of the housing 2.

It should be underlined, however, that quite differently from resins and silicones, foam S can be removed in a simple and fast manner, due to its feature of limited resistance to tearing; for this reason its removal can take place by simple brushing of the housing 2.

According to the above description the features of the electromechanical device and the relevant method to insulate the components of an electromechanical device object of the present invention are apparent, and their advantages clear. Specifically, according to the above description, it is clear that according to the present invention an electromechanical device can be provided, wherein insulation of certain components from the environment is possible, without affecting however the general operation of the device and/or causing a complex, time-taking or expensive industrial production.

This is obtained using for insulation an expanding material, particularly a silicone elastomer capable to reticulate and forming a protective foam.

Such an insulating material appears to be specifically suitable for either small or wide motions of mechanical elements of the device; specifically, small movements are allowed due to the high elasticity and compressibility of the material, whereas wide motions are allowed by the possibility of partial removals/tearings of the material itself, as previously described.

As said, after filling the housing with the insulating material, the mechanical elements of the device can easily torn and compress said material, restoring the various original sliding or motion seats; such a removal can also take place by lower forces, since the material structure allows for an easy tearing; a likely presence of movable residues of the torn filling material does not cause any inconveniences, since they are insulating, self-lubricating, compressible and further crumbling.

Within this frame, the present invention has the following advantages:

- the proposed material has excellent electric insulating features and is dampproof to humidity;
- the proposed material is suitable to warrant a complete coating of the parts to be insulated from the environment and its aggressive agents;
- the expansion of the material allows for a fast filling of all the areas to be protected;
- the elasticity and low mechanical resistance of the proposed material prevent clogging risks to the device, since the eventual material in excess depositing on movable elements can be torn off and compressed by the elements themselves without affecting the operation of the device;
- at the light of the preceding issue, it is also apparent that in case of an excess metering of the material, there will not be any clogging risks;
- the material has such features (viscosity, fast setting) to reduce leakage of material from likely joints of the housing;
- any material eventually leaking from any fissures or openings provided in the housing can be removed by simple and fast operations;
- the insertion speed of the proposed insulating material is high; a couple of minutes after injection the part can be transferred to a subsequent process operation;
- the elasticity of the suggested material, due to its spongy or netting structure, prevents any internal stresses to the device and its consequent failure;
- the proposed material is thermally 'neutral', in the sense that it does not act as a thermal flywheel or dissipator, so it does not change the product features;
- the proposed material does not degrade at high operating temperatures of the device (in the order of 200° C.), thus warranting the required reliability with time;
- the special type of insulation allows savings, since moderate quantities of raw material allow to obtain high volumes of insulation, thanks to the capability of the material to 'expand'

It is clear that many changes are possible for the man skilled in art to the electromechanical device described above, without departing from the principles of the innovative idea, as it is also clear that in the practical actuation of the invention the components described by way of example may be different and replaced with other technically equivalent elements.

In this connection, it is underlined that in the above description reference has been made to an actuator device of the thermal type, but it is obvious that this invention is directly applicable to any kind of electromechanical device where some of its internal components need to be insulated from the environment and/or water, whenever they are located near movable elements or kinematic motions.

It is also clear that the device according to the present invention may comprise electric and mechanical apparatuses for movement in general, though not necessarily including an actuating element inside; on the other hand, the actuating elements may be of different type from the ones described by way of example, such as for instance an electromagnet or motor, etc.; while the electric parts may obviously comprise electronic or electromagnetic circuits, etc.

Moreover, the given example refers to a well determined type of expanding elastomer, but it is obvious that it may be replaced with any materials having similar features being compatible with the objects of the above invention.

What is claimed is:

1. An electromechanical device, of the type comprising a housing containing components subject to electric voltage, located near mechanical elements which are movable during operation of the device, whereby an insulating material is present within said housing, which surrounds said components subject to electric voltage and can be directly in contact with at least a portion of said movable mechanical elements, wherein said material is expandable, whereby following a movement of said mechanical elements which occurs during at least the first operation of the device, at least a portion of said expandable material can be compressed or torn off or occupy different regions inside said housing, while allowing said components subject to electric voltage to be insulated from the environment.

2. A device according to claim 1, wherein said movable mechanical elements can execute wide motions.

3. A device according to claim 1, wherein said expandable material is capable of reticulating, forming a foam.

4. A device according to claim 1, wherein said expandable material comprises a silicone elastomer.

5. A device according to claim 1, wherein said expandable material is able to quickly coat all surfaces of said components subject to electric voltage.

6. A device according to claim 1, wherein said expandable material is moisture-resistant.

7. A device according to claim 1, wherein said expandable material is able to quickly expand and reticulate.

8. A device according to claim 1, wherein said expandable material consists of two components.

9. A device according to claim 1, wherein said expandable material is curable at room temperature.

10. A device according to claim 1, wherein said expandable material is resistant to high operating temperatures of the device.

11. A device according to claim 1, wherein said expandable material is substantially thermally neutral.

12. A device according to claim 1, wherein said expandable material is able to form a uniform continuous film on surrounding surfaces.

13. A device according to claim 1, wherein said housing is rigid.

14. A device according to claim 1, wherein said housing has at least one opening.

15. A device according to claim 1, wherein said device is adapted to be actuated in response to heat.

16. A device according to claim 1, wherein said movable mechanical elements comprise a shaft and a thermal actuator for moving said shaft.

17. A device according to claim 1, wherein said movable mechanical elements comprise a spring.

18. A method to insulate from the environment components of an electromechanical device, said components being contained inside a housing near mechanical elements movable during the operation of the device, and an insulating material being present within said housing, which surrounds said components and can be directly in contact with at least a portion of said movable mechanical elements, comprising injection of an expandable insulating material into said housing, and causing said material to expand within said housing once injected, whereby said insulating material, once expanded within said housing, can be at least partly compressed, or torn off, or occupy different regions inside said housing, following movement of said mechanical elements which occurs during at least the first operation of the device, while allowing said components subject to electric voltage to be insulated from the environment.

19. A method according to claim 18, wherein said insulating material is a silicone elastomer.

20. A method according to claim 18, wherein said insulating material consists of two components.

21. A method according to claim 20, wherein said insulating material is introduced into said housing through a static mixer.

22. A method according to claim 18, whereinsaid insulating material is curable at room temperature.

23. A method according to claim 18, further comprising removing insulating material that leaks from the housing.

24. A method of use of a silicone elastomer for insulating from the environment components of an actuator device, said components being contained in a housing near mechanical elements that are movable during operation of the device and said elastomer being directly in contact with at least a portion of said movable mechanical elements, comprising causing said silicone elastomer to expand and reticulate to form a protective foam, and following movement of said mechanical elements which occurs during at least the first operation of the device, subjecting the expanded material to being compressed or torn off or occupying different regions inside said housing, while allowing said components subject to electric voltage to be insulated from the environment.

25. A device according to claim 1, wherein said expandable material has a low mechanical resistance to tearing.

26. A device according to claim 1, wherein said expandable material is elastic.

27. A device according to claim 1, wherein said expandable material is compressible.

28. A method according to claim 18, wherein said insulating material can reticulate and form a protective foam.

29. A method according to claim 18, wherein said insulating material has a low mechanical resistance to tearing.

30. A method according to claim 18, wherein said insulating material is elastic.

31. A method according to claim 18, wherein said insulating material is compressible.

32. A method according to claim 24, further comprising subjecting said components to an electric voltage.

* * * * *